US009542498B2

(12) United States Patent
Zargahi et al.

(10) Patent No.: US 9,542,498 B2
(45) Date of Patent: *Jan. 10, 2017

(54) PROVISION OF APPLICATIONS TO MOBILE DEVICES

(71) Applicant: Microsoft Technology Licensing, LLC, Redmond, WA (US)

(72) Inventors: Kamran R. Zargahi, Seattle, WA (US); John Bruno, Snoqualmie, WA (US); Nathaniel Clinton, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,855

(22) Filed: Apr. 5, 2016

(65) Prior Publication Data

US 2016/0217215 A1 Jul. 28, 2016

Related U.S. Application Data

(63) Continuation of application No. 14/228,941, filed on Mar. 28, 2014, now Pat. No. 9,405,837, which is a (Continued)

(51) Int. Cl.
*G06F 9/445* (2006.01)
*G06F 17/30* (2006.01)
(Continued)

(52) U.S. Cl.
CPC .......... *G06F 17/30867* (2013.01); *G06F 8/61* (2013.01); *G06F 17/30554* (2013.01); *H04M 1/72522* (2013.01); *H04W 4/003* (2013.01)

(58) Field of Classification Search
CPC .................... G06F 17/30554; G06F 17/30867; G06F 8/61; H04M 1/72522; H04W 4/003
See application file for complete search history.

(56) References Cited

U.S. PATENT DOCUMENTS 6,496,979 B1 12/2002 Chen et al.
7,113,981 B2 9/2006 Slate
(Continued)

OTHER PUBLICATIONS

Kowalczyk, R. et al., "InterMarket—Towards Intelligent Mobile Agent e-Marketplaces," Proceedings of the Ninth Annual IEEE International Conference and Workshop on the Engineering of Computer-Based Systems (ECBS'02), Apr. 8, 2002, Lund, Sweden, 8 pages.

(Continued)

*Primary Examiner* — Jorge A Casanova
(74) *Attorney, Agent, or Firm* — Dan Choi; Micky Minhas

(57) ABSTRACT

Embodiments related to the provision of applications to mobile devices are disclosed. One embodiment provides a mobile device application server system, comprising a database, a processor, and memory comprising instructions stored thereon that are executable by the processor to perform a method of providing applications to mobile devices. The method comprises receiving a first application configured to be run on a first mobile device type, storing the first application, receiving a second application configured to be run on a second device mobile device type, and storing the second application. The method further comprises receiving a request for the first application from a first mobile device of the first mobile device type, providing the first application to the first mobile device, receiving a request for the second application from a second mobile device of the second mobile device type, and providing the second application to the second mobile device.

20 Claims, 8 Drawing Sheets

Related U.S. Application Data continuation of application No. 12/422,622, filed on Apr. 13, 2009, now Pat. No. 8,725,745.

(51) Int. Cl.
*H04M 1/725* (2006.01)
*H04W 4/00* (2009.01)

(56) References Cited

U.S. PATENT DOCUMENTS

| | | |
|---|---|---|
| 7,206,647 B2 | 4/2007 | Kumar |
| 7,275,243 B2 | 9/2007 | Gibbons et al. |
| 7,409,208 B1 | 8/2008 | Clare et al. |
| 7,551,922 B2 | 6/2009 | Roskowski et al. |
| 7,676,802 B2 | 3/2010 | Mittal |
| 2002/0131404 A1 | 9/2002 | Mehta et al. |
| 2003/0084096 A1 | 5/2003 | Starbuck et al. |
| 2005/0038688 A1 | 2/2005 | Collins et al. |
| 2006/0288015 A1 | 12/2006 | Schirripa et al. |
| 2007/0061300 A1 | 3/2007 | Ramer et al. |
| 2008/0153473 A1 | 6/2008 | Lorenzo et al. |
| 2009/0197580 A1 | 8/2009 | Gupta et al. |

OTHER PUBLICATIONS

Chrysanthis, P. et al., "From Location Databases to Pervasive Catalog," Proceedings of the 13th International Workshop on Database and Expert Systems Applications (DEXA'02), Sep. 2, 2002, Aix en Provence, France, 6 pages.

"Handango to Offer Windows Mobile and Tablet PC Content Through Windows Marketplace," redOrbit Website, Available Online at www.redorbit.com/news/technology/515451/handango_to_offer_windows_mobile_and_tablet_pc_content_through/index.html, May 24, 2006, 4 pages.

"uiOne: Using Device Personalization to Promote Mobile Data Services," Qualcomm Incorporated Publication, Available Online at www.easemobile.com/uione$_{personalization}$_mobiledata.pdf, Nov. 27, 2007, 18 pages.

"Applications unlike anything you've seen on a phone before," Apple iPhone Website, Available Online at www.apple.com/iphone/appstore/, Available as Early as Jul. 19, 2008, Retrieved Jan. 29, 2009, 2 pages.

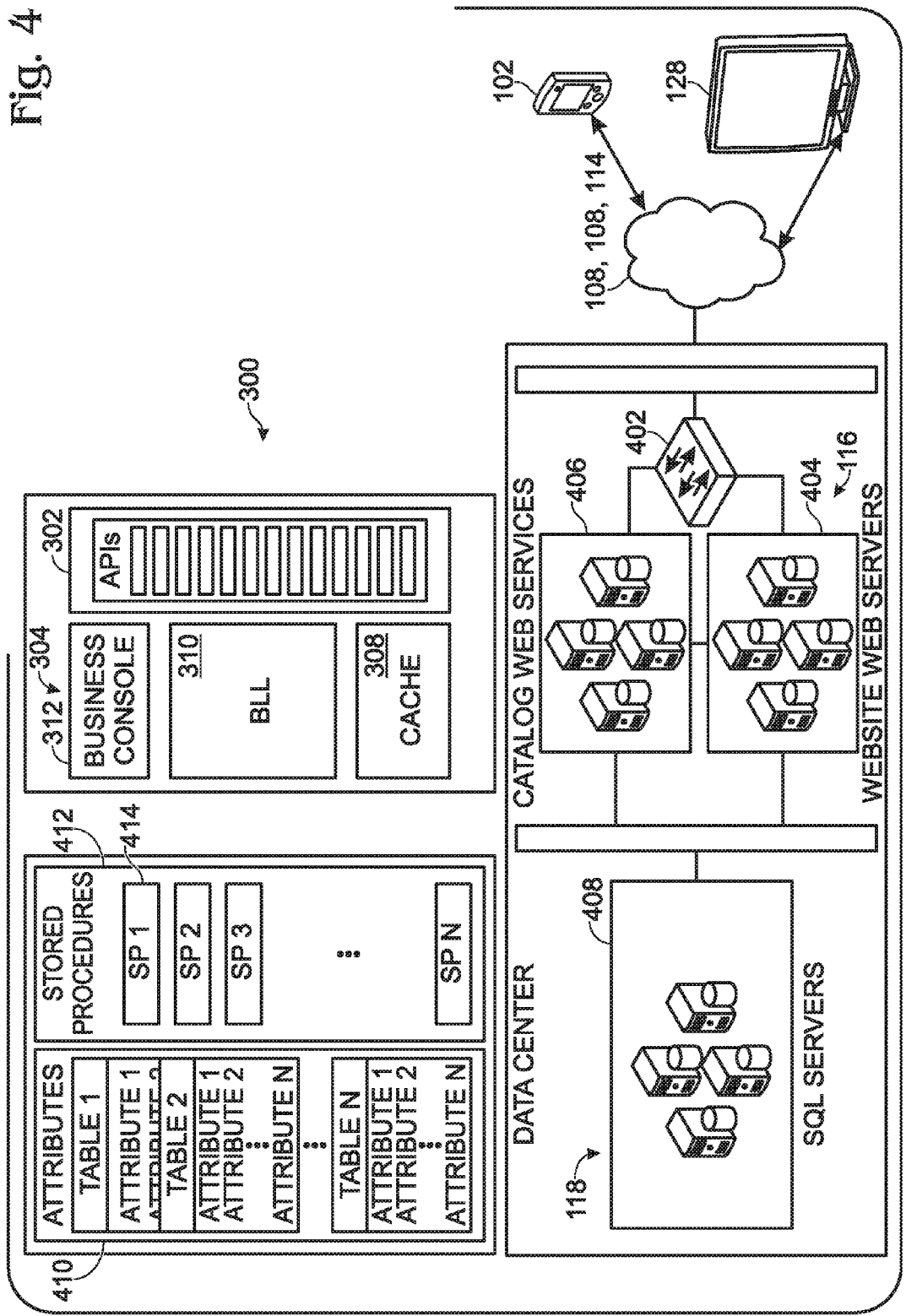

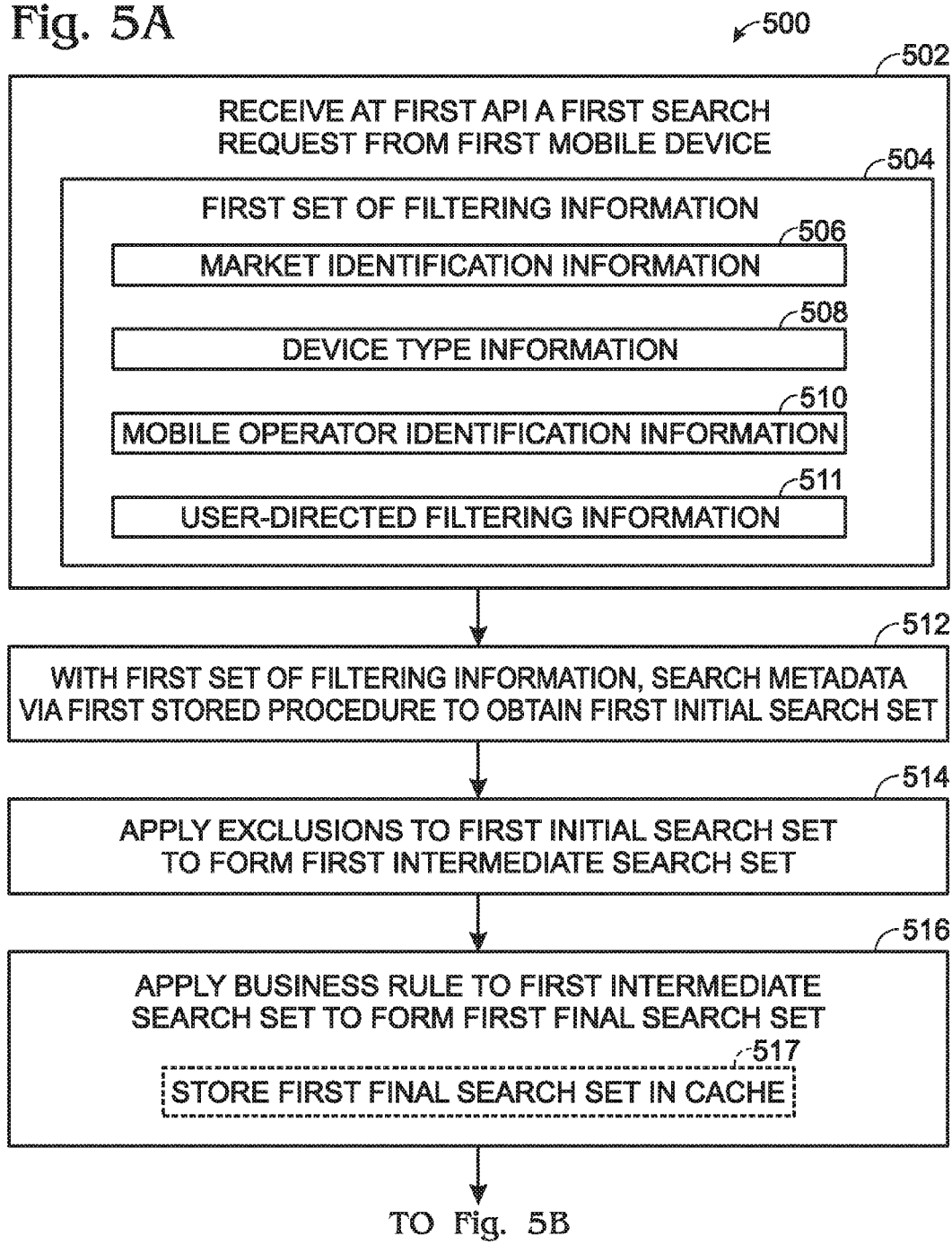

PROVISION OF APPLICATIONS TO MOBILE DEVICES

CROSS REFERENCE TO RELATED APPLICATIONS

This application is a continuation of U.S. patent application Ser. No. 14/228,941, filed Mar. 28, 2014, which is a continuation of U.S. patent application Ser. No. 12/422,622, filed Apr. 13, 2009, now U.S. Pat. No. 8,725,745, the entirety of each of which are hereby incorporated by reference for all purposes.

BACKGROUND

Various mobile devices, including but not limited to smart phones, netbooks, other notebook computers, personal media players, and the like, may be configured to allow a user to install and run various applications such as games, utilities, etc. Such applications may be provided by an internet-connected service provider, mobile service provider, mobile device manufacturer, mobile device software manufacturer, and/or third party, via an application server that acts as an "application store" from which users can download applications, sometimes for a fee.

In some environments, a mobile device application server may be configured to provide applications to a single type of device (e.g. single type of mobile phone from single manufacturer) that operates on a single mobile network. Further, in such environments, users may obtain applications from a single source via a single distribution channel, such as a desktop client running on a computer to which the mobile device is connected. Therefore, due to the restrictions of such a use environment, it may be relatively simple to ensure that devices requesting a list of available applications are sent compatible applications.

SUMMARY

Various embodiments related to the provision of applications to mobile devices are disclosed herein. For example, one embodiment provides a mobile device application server system, comprising a database, a processor, and memory comprising instructions stored thereon that are executable by the processor to perform a method of providing applications to mobile devices. The method comprises receiving a first application configured to be run on a first mobile device type, storing the first application, receiving a second application configured to be run on a second device mobile device type, and storing the second application. The method further comprises receiving from a first mobile device of the first mobile device type a request for a list of applications that are compatible with the first mobile device type, determining a list of applications that comprises the first application, sending the first mobile device the list of applications that comprises the first application, receiving a request for the first application from the first mobile device, and providing the first application to the first mobile device. The method further comprises receiving from a second mobile device of the second mobile device type a request for a list of applications that are compatible with the second mobile device type, determining a list of applications that comprises the second application, sending the second mobile device the list of applications that comprises the second application, receiving a request for the second application from the second mobile device, and providing the second application to the second mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows an example embodiment of a physical architecture for the logical architecture of FIG. 3.

FIGS. 5A and 5B show an embodiment of a method of providing lists of compatible applications to mobile devices.

DETAILED DESCRIPTION

Figure 1:
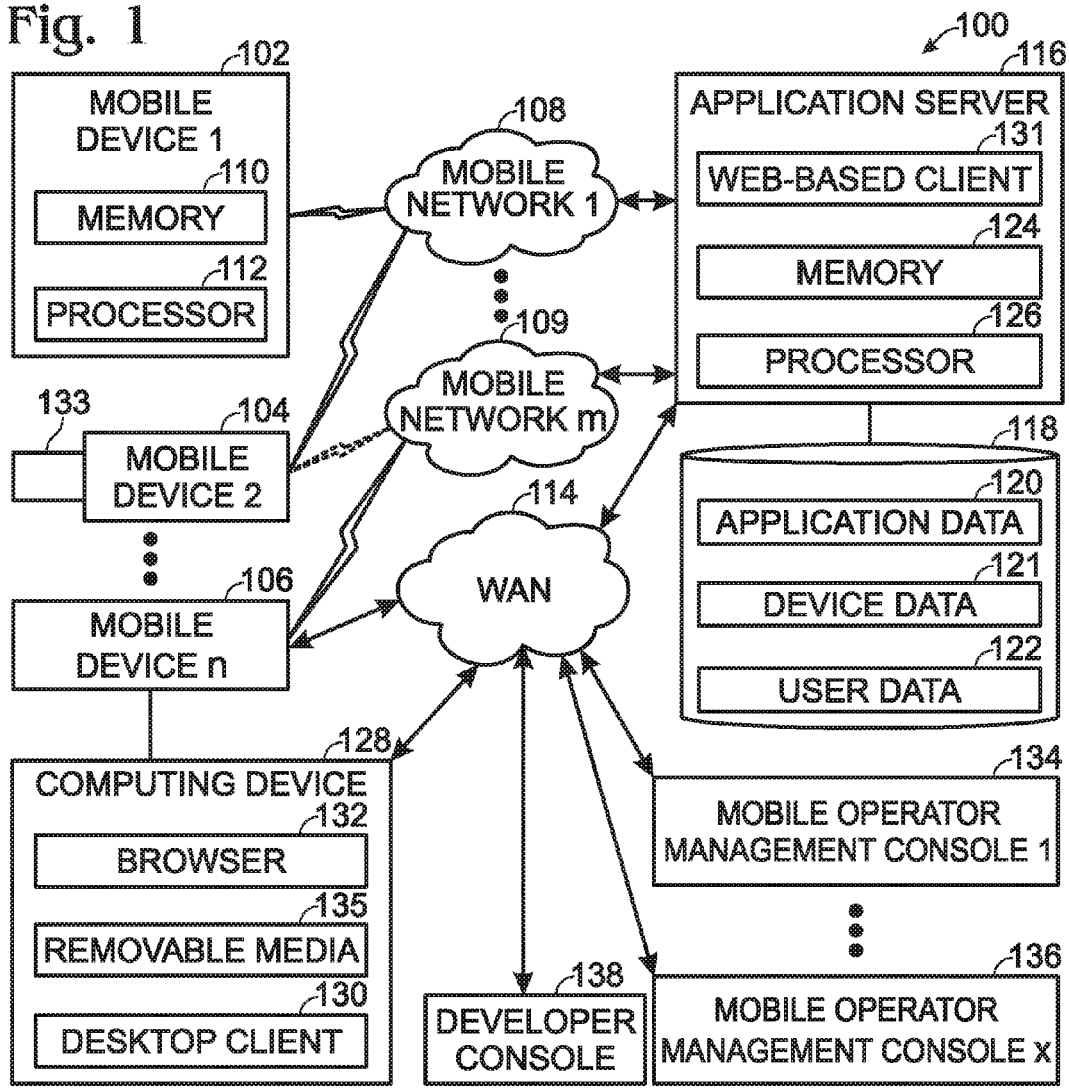
FIG. 1 shows an embodiment of an example mobile device use environment.

Embodiments are disclosed herein that relate to the provision of applications to mobile devices in use environments in which applications may be provided via multiple different distribution channels, to multiple different types of mobile devices, to devices running on multiple different networks (mobile networks and computer networks), running multiple different operating systems, operating in multiple different geographic regions that may have different languages and regulatory environments, that may use different currencies, etc. It will be understood that the term "mobile device" as used herein may include any suitable mobile device, including but not limited to, smart phones and other cellular phones, notebook computers such as so-called "netbooks", portable media players, personal digital assistants, etc. Further, the term "mobile device application server" may include any server configured to provide applications to mobile devices over any suitable communications channel.

Before discussing the provision of applications for mobile devices, an example embodiment of a mobile device use environment 100 is described with reference to FIG. 1. Mobile device use environment 100 comprises a plurality n of mobile devices (depicted as three mobile device 102 (mobile device 1), 104 (mobile device 2), 106 (mobile device n)) that are in communication with a plurality m of mobile networks, depicted as two example mobile networks 108 (network 1) and 109 (network m). Via mobile networks 108, 109, mobile devices 102, 104, 106 may communicate with each other in various ways, including but not limited to via voice data, text messaging, email, etc. In the depicted embodiment, three mobile devices communicating with two mobile networks are shown for the purpose of example, but it will be understood that any suitable number of mobile devices may be in communication with any suitable number of mobile networks. Generally, each mobile device will communicate preferentially with a mobile network associated with a mobile operator with whom a user has a billing account associated with the device, but may connect to other mobile networks if that mobile network is not connectable (e.g. out-of-range), as indicated by the dashed-line connection of mobile device 104 to mobile network 109.

Each mobile device comprises memory 110 configured to store computer-readable instructions such as applications and other programs, and a processor 112 configured to execute the applications and other programs stored in memory 110. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Mobile devices 102, 104, 106 also may be in communication with a TCP/IP data network, such as a WAN 114, as another channel of communication. For example, as depicted in FIG. 1, mobile device n 106 may be configured to connect to a WAN such as the Internet via a wireless protocol such as 802.11a, 802.11b, 802.11g, 802.11n, or any other suitable protocol.

Mobile devices 102, 104, 106 may communicate with a mobile device application provision system to obtain mobile device applications. The depicted mobile device application system comprises a mobile device application server 116 and a database 118. The mobile devices 102, 104, 106 may communicate with the mobile device application server 116 via the mobile networks 108, 109 and/or WAN 114. Application server 116 further may be in communication with one or more databases, represented by database 118 in FIG. 1, that store mobile device applications and various items of data related to the provision of applications to mobile devices. For example, as depicted in FIG. 1, the database 118 may comprise application data 120. Such application data 120 may include binary (or other type) application files that are downloadable by mobile devices 102, 104, 106, actions that have been requested for such application files, etc. While FIG. 1 depicts direct connections between the mobile networks and the application server 116, it will be understood that the mobile networks may connect to the application server 116 via a computer network to which the application server and the mobile networks are connected.

The application data 120 may contain applications provided by multiple developers and/or vendors for multiple different types and brands of mobile devices, each of which may run different operating systems (including OEM specific fragmentations of common operating systems). Therefore, the application data 120 further may include metadata related to the application files that allow users of mobile devices 102, 104 106 to use search queries to locate desired applications that are compatible with the users' mobile devices. The metadata that is stored as application data 120 may comprise any suitable information. For example, the metadata may include information regarding the device type, operating system, and mobile operator identity for which a particular application is intended for use. The application metadata also may include information regarding the cost of the application, any promotional pricing changes or the like to be applied to the application, information regarding the geographic markets and end-user language for which the application is intended, editorial content such as media and consumer reviews of an application, any mobile operator-related business policies that are to be applied to the purchase and/or use of an application, and/or any other suitable type of metadata related to applications stored in the database 118. More information regarding such application-related metadata is described below.

Database 118 also may store device data 121. The device data 121 may include metadata related to mobile devices that are provided by the various mobile operators using the mobile device application server 116 to provide applications. The device data 121 also may include information related to various policies (e.g. business policies, billing policies, etc.) of the mobile operators. More information on device-related metadata is described below.

Database 118 also may store user data 122. The user data 122 may include data related to individual users, including but not limited to a user's identity, account number, credit card/debit card/other payment mechanism, type of mobile device used by each user, geographic location of each user, language preferences of each user, applications previously downloaded by each user, etc. This data may allow applications that are incompatible with a user's mobile device, geographic location, language, etc. to be filtered from a database query for applications. More information describing such user-related metadata is described below.

Continuing with FIG. 1, the mobile device application server 116 comprises memory 124 configured to store computer readable instructions executable by a processor 126 and/or other logic components to perform the various tasks in the course of managing the provision of applications to mobile devices. For example, such instructions may be executable to communicate with mobile devices 102, 104, 106 over the mobile network 108 and WAN 114 to provide applications, to synchronize state, to revoke applications, etc.; to communicate with the database 118 to execute search queries and communicate search results to the mobile devices 102, 104 106; and to perform various other functions and operations, including but not limited to those described herein.

The mobile device application server 116 also may be configured to provide applications to mobile devices via other communication channels. For example, as depicted in FIG. 1, a mobile device 106 may be configured to be connected (via a tether, wireless connection, etc.) to a computing device 128, such as a laptop or desktop computer, to allow communication with the application server 116 via the computing device 128. Such communication may take place via a desktop client 130 installed on the computing device 128, via a network-based client 131 ("web-based client) on mobile device application server 116 executed via an Internet browser application 132, or in any other suitable manner. It will be understood that such a browser also may be run directly on mobile devices 102, 104, 106.

End-users of the mobile devices 102, 104, 106 also may be able to load applications onto a mobile device in ways other than during a communication session with the application server 116. For example, a removable media storage device, such as a flash memory drive or the like, may be used to side load an application onto a mobile device. The application may have been previously obtained, for example, via a desktop or web-based client. In FIG. 1, example side load scenarios are depicted as a removable storage medium 133 coupled to mobile device 104, and also a removable storage media receptacle/connector 135 provided on computing device 128. It will be understood that a mobile device may be configured to synchronize any state changes made via a side load with the mobile device application server 116 upon the occurrence of a side load of new content.

Continuing with FIG. 1, mobile operators may be able to interact with the mobile device application server 116 via a mobile operator management console. A plurality x of mobile operator management consoles are shown as two example consoles 134, 136, but it will be understood that any suitable number of mobile operators may be in communication with the mobile device application server 116 via any suitable number of management consoles. Each mobile operator management console 134, 136 may allow a mobile operator to submit new applications for inclusion in the database 118, to submit updates and new versions to existing applications, to submit promotions for applications, to modify pricing, business rules, and other information related to specific applications, to revoke applications, and to take any other suitable action related to programs submitted by a mobile operator and/or configured to be operated on devices that access the mobile operator's network.

Various other parties besides a mobile operator also may be able to submit applications, and control various aspects of previously-submitted programs, on the mobile device application server 116. For example, some programs may be provided by third-party software developers and/or vendors, either affiliated with or not affiliated with a specific mobile operator. Such developers and/or vendors may submit applications, updates, revocations, etc. for inclusion on the mobile device application server 116 via a developer console 138 that may be provided, for example, as a part of a software development kit provided by the operator of the mobile device application server 116, by a mobile operator, etc. Likewise, applications, updates, revocations, etc. from a third-party developer and/or vendor may be submitted either through a mobile operator, or directly to the application server 116, via WAN 114 or other suitable communication channel. A single developer console is shown for the purpose of example, but it will be understood that any suitable number of developers and/or vendors may communicate with the application server 116 via development consoles.

It will be understood that mobile device use environment embodiment depicted in FIG. 1 is shown for the purpose of example, and is not intended to be limiting in any manner.

As described above, mobile device application server 116 may be configured to provide applications via multiple different distribution channels, to multiple different types of mobile devices, to devices running on multiple different networks (mobile networks and computer networks), running multiple different operating systems, operating in multiple different geographic regions that may have different languages and regulatory environments, that may use different currencies, etc. This is in contrast to use environments in which in which applications are provided to a single device type via a single distribution channel.

Figure 2:
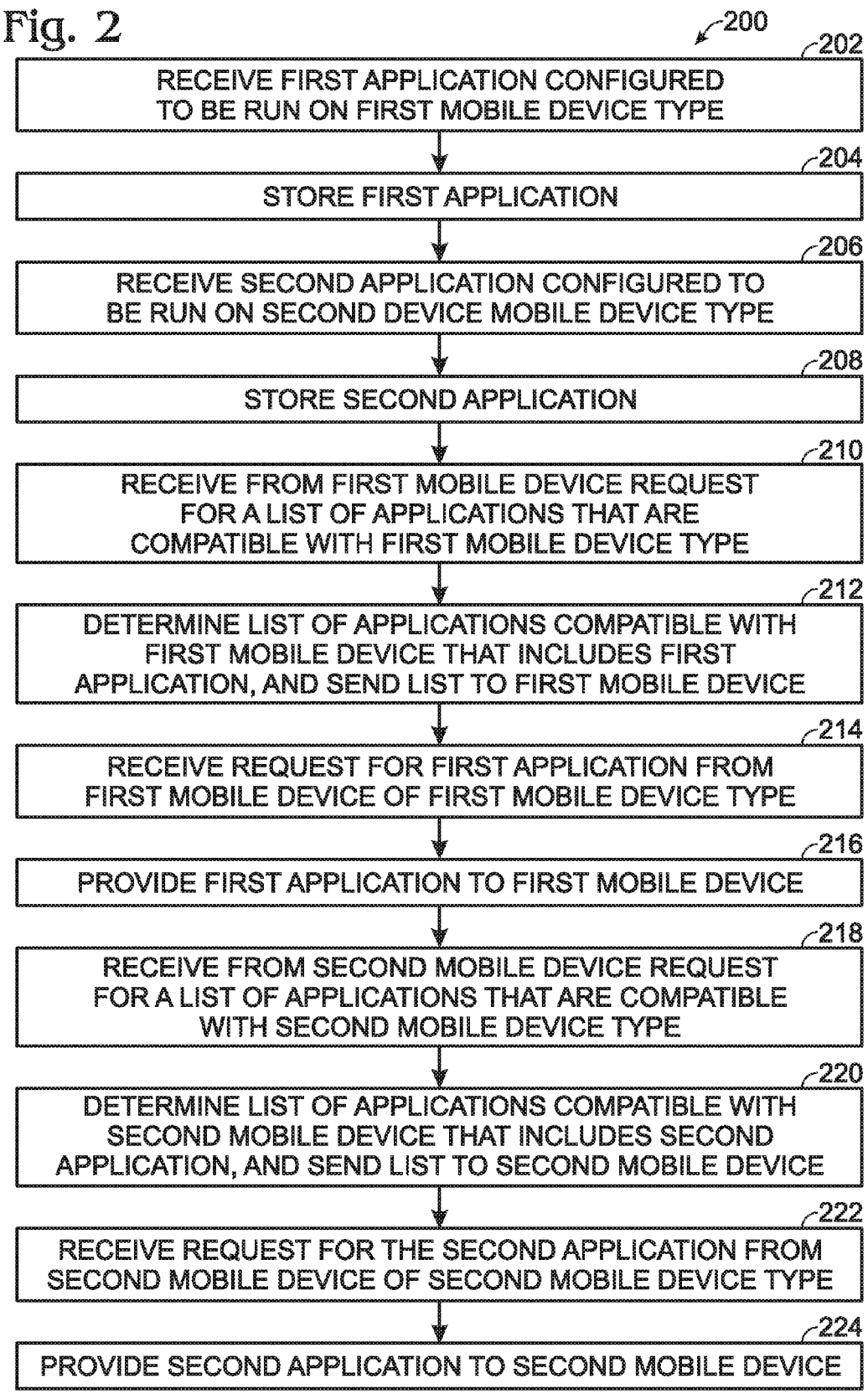
FIG. 2 shows an embodiment of a method of providing applications to mobile devices.

FIG. 2 shows an embodiment of a method 200 of providing applications to mobile devices in such a use environment. Method 200 comprises, at 202, receiving a first application configured to run on a first mobile device type, and at 204, storing the first application. Method 200 further comprises, at 206, receiving a second application configured to run on a second mobile device type, and then, at 208, storing the second application.

The first application and second application may, for example, be two different versions of a single application, provided by a single vendor, that are configured to run on different operating systems, on devices configured to run on different mobile networks, etc. The first and second application also may be two unrelated applications, whether provided by a single vendor or by different vendors, that are configured to run on different device types. The term "different device types" and the like as used herein refer to mobile devices that differ in manufacturer, operating system, mobile operator, and/or any other characteristic that limits the ability of an application configured to run on one device from running properly on another device. The term "different device types" also may include differences in device type such as language, regulatory/legal requirements, specific mobile operator policies, etc. that may prevent a user in one geographic/legal/mobile operating space from enjoying the use of such an application in another geographic/legal/mobile operating space.

Continuing with FIG. 2, method 200 next comprises, at 210, receiving from a first mobile device of the first mobile device type a request for a list of applications that are compatible with the first mobile device type. This request may include, for example, information regarding the first mobile device that can be used to filter for applications that are compatible with the first mobile device. Next, at 212, method 200 comprises determining a list of applications that comprises the first application (for example, via use of the filtering information), and sending the list to the first mobile device. Next, method 200 comprises, at 214, receiving a request for the first application from the first mobile device, and at 216, providing the first application to the first mobile device.

Method 200 further comprises, at 218, receiving from a second mobile device of the second mobile device type a request for a list of applications that are compatible with the second mobile device type. This request may include, for example, information regarding the second mobile device that can be used to filter for applications that are compatible with the second mobile device. Next, at 220, method 200 comprises determining a list of applications that comprises the second application, and sending the list to the first mobile device. Next, method 200 comprises, at 222, receiving a request for the second application from a second mobile device of the second mobile device type, and at 224, providing the second application to the second mobile device. In this manner, each different type of device is presented with applications configured to run on that type of device.

The filtering information used to determine whether applications are compatible with a requesting mobile device may comprise information that identifies the manufacturer, mobile operator, operating system, geographic region, and other characteristics of the requesting mobile device. Further, each list of applications may be additionally tailored to include applications that meet specific user-selectable search parameters.

Therefore, as described above, various items of metadata may be stored in database 118 to help assemble a list of suitable applications for a mobile device requesting to view a list of available applications. Some such metadata may be applied at the database level during a query of the database, while other metadata may be applied as business rules against a search result set acquired in the database query. Further, a requesting device may include various filtering information in its request to assist with the query. Examples of such filtering information include, but are not limited to, device identification information (e.g. a device code that contains information regarding device capabilities, device operating system, device AKU (adaption kit update), mobile operator information (e.g. mobile operator identification code), and/or market identification information (e.g. currency, language, country, etc.). A search request also may include additional filtering information that allows a list of applications to be further narrowed by user interest. For example, a user may wish to see a list of most popular applications, a list of most highly rated applications, a list of free applications, etc. It will be understood that these specific items of filtering information are disclosed for the purpose of example, and are not intended to be limiting in any manner.

Figure 3:
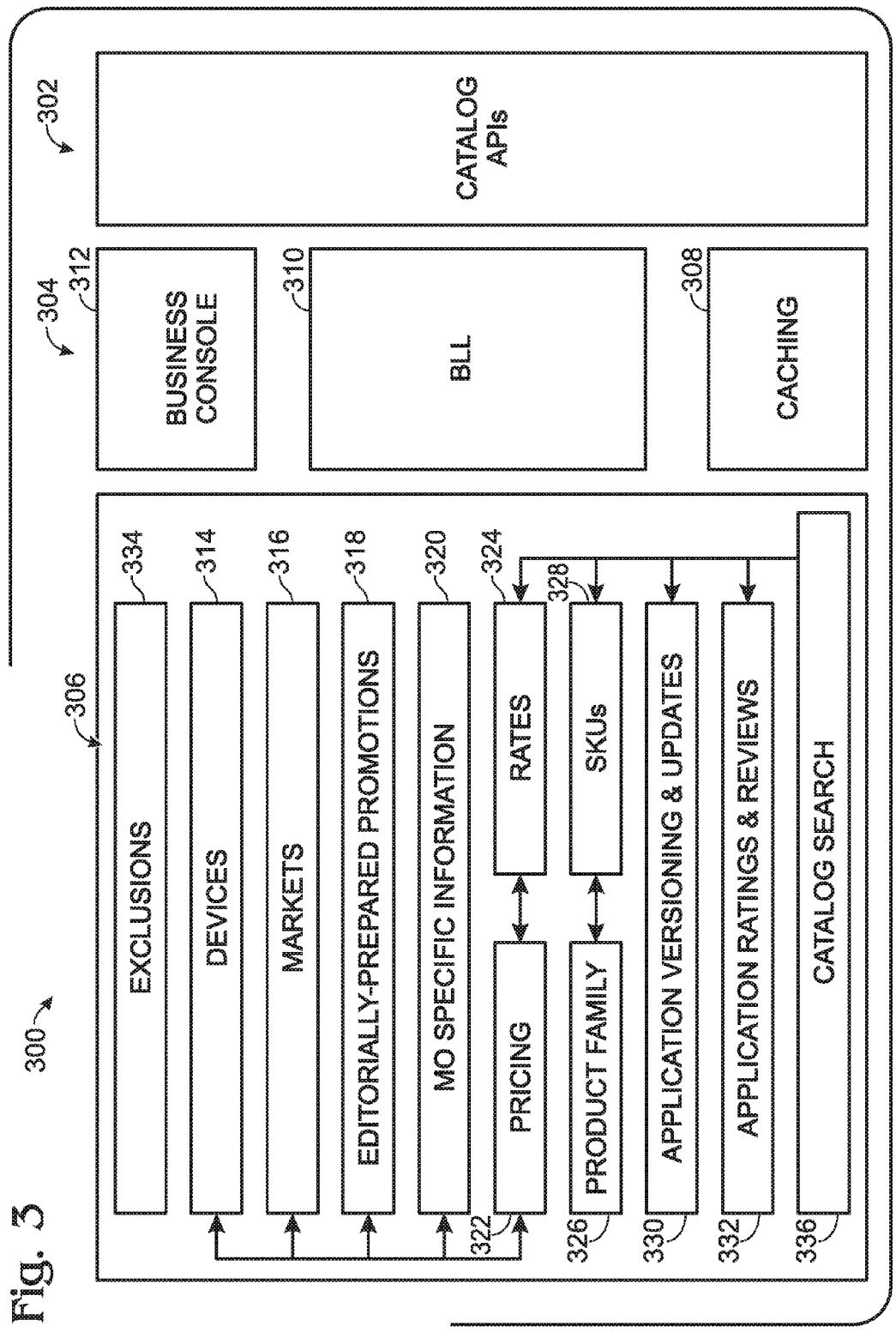
FIG. 3 shows an embodiment of a logical architecture of a system for providing applications to mobile devices.

FIG. 3 shows an embodiment of a logical architecture 300 of a system for providing users of a mobile device server with the ability to locate applications suitable for each user's specific mobile device. Architecture 300 comprises an API (application programming interface) layer 302, a logic layer 304, and a data layer 306. The API layer 302 comprises one or more APIs configured to interface with device clients, desktop clients, browsers, and other clients that are used by mobile device users to obtain mobile devices from a mobile device application server. As described below, in some embodiments, the API layer 302 may comprise multiple APIs that are each mapped to different clients and different search filters and/or requests that may be used by mobile device users requesting a search.

The logic layer 304 comprises a cache 308, a business logic layer 310, and a business console 312. The cache 308 may be used to store search result sets, as described in more detail below. As the logic layer 304 and the data layer 306 may be located on physically separate machines, including a cache 308 at the logic layer may improve search performance for future queries where search results have been previously stored in cache 308. Search results may be stored in cache 308 for any suitable time duration. Examples include, but are not limited to, TTLs (time to live) of one to five hours. In some embodiments, the TTL may vary as a function of a rate at which new applications and/or application state changes are received by the application server 116. Search results stored in the cache may be subsequently federated to multiple consumers of the information, i.e. multiple mobile devices seeking the information.

The business logic layer 310 may comprise business rules, decision trees, and other such logical components that aid in searching for applications. For example, the business logic layer 310 may comprise decision logic that determines whether the results of a search request have been previously stored in cache 308. Further, the business logic layer 310 (and/or business console 312) may utilize various items of metadata for use in further filtering search results returned from a query of data layer 306 via filtering parameters provided by requesting mobile devices. For example, in some embodiments, rules and policies that may change frequently (i.e. some pricing information, promotional information, market-related information) may be implemented in business logic layer 310. Business console 312 may allow an administrator to modify such business rules applied by business logic layer 310 when desired. Other examples of business rules that may be implemented at the business console 312 include, but are not limited to, the provision of custom promotional options for mobile providers, the enablement of override and/or acceptance of criteria evaluated when new content or changes to current content are provisioned to the application server 116 by a software developer or software vendor, and/or the enablement of the ability to enable/disable features, and/or otherwise modify the behavior of features, of the application server 116.

Continuing, the data layer 306 comprises various groupings of metadata associated with applications that may be used to locate suitable applications for a specific requesting mobile device, and that are logically grouped together. For example, the data layer may include device-related metadata 314, market-related metadata 316, promotion-related metadata 318, mobile operator-related metadata 320, pricing-related metadata 322, subscription rate-related metadata 324, product family-related metadata 326, SKU (stock-keeping unit)-related metadata 328, application versioning and update-related metadata 330, and application ratings and reviews-related metadata 332.

The device-related metadata 314 may include such metadata as device operating system, device type, device operating system version, and the like. The market-related metadata 316 may include such metadata as a country, language, currency, etc. intended for a particular application. The market-related metadata 316 also may include information regarding local policies, local laws, and the like. As a specific example, if a country does not allow applications to be sold that scan bar codes, metadata regarding this specific location-based exclusion may be contained within the market-related metadata 316. The promotion-related metadata 318 may include, for example, information on editorially selected applications that reflect agreements with third parties, information related to discounts (e.g. coupons, etc.), and the like.

Continuing with FIG. 3, the mobile operator-related metadata 320 may include any suitable mobile operator-related information. For example, the mobile operator-related information may include a list of mobile operators with whom a mobile application provider does business, specific policies of each mobile (e.g. a list of other mobile operators that are considered competitors to a selected mobile operator), and other such information. As a more specific example, one mobile operator may wish not to have applications developed by that mobile operator shown to customers of other mobile operators, even if the customers of the other mobile operators are using mobile devices with which the applications are compatible. Therefore, metadata related to excluded mobile providers may be contained in the mobile operator-related metadata 320. It will be understood that this example of an exclusion is presented for the purpose of example, and is not intended to be limiting in any manner.

Next, the pricing-related metadata 322 and subscription rate-related metadata 324 may contain specific pricing and/or subscription rate metadata for each application. This may allow a user to search for applications based upon desired price/rate ranges. The pricing-related metadata also may include billing policies for mobile operators, for specific applications, etc. For example, the pricing-related metadata 322 may include information specifying whether to bill a purchaser of an application through the mobile operator, or via a credit card. The product family-related metadata 326 and stock keeping unit-related metadata 328 may allow tracking of specific items and/or families of items, for example, for record-keeping and tracking purposes.

The application versioning and updates-related metadata 330 may comprise metadata related to the tracking of application versions and updates for users that have previously been provided an application. Therefore, the application versioning and updates-related metadata 330 may contain information used in a synchronization process with a mobile device to allow a user to determine if updates are available for the applications on the mobile device.

Continuing with FIG. 3, the application ratings and reviews-related metadata 330 may comprise feedback from media reviews, user reviews, and any other suitable source of user feedback related to specific applications. This may allow a user to view reviews and ratings for a selected application, and also may allow a user to search for applications based upon an application's ratings.

Next, the data layer may include exclusions-related metadata 334. The exclusions-related metadata 334 comprises such metadata as mobile operator policies regarding a mobile operator's exclusions of selected application types, a mobile operator's exclusions due to competitive concerns, exclusions due to legal concerns of specific jurisdictions, and any other such exclusions. In some embodiments (as depicted), the exclusions may be applied as a thick layer of exclusion management separating the data layer 306 from the logic layer 304, such that the exclusions are applied after a search result set has been otherwise compiled from the other metadata in the data layer 306 (as depicted). In other embodiments (not depicted), the exclusions may be applied as a thin layer located at each group of metadata, such that exclusions are applied separately to each group of metadata searched, rather than as a thick layer.

The data layer 306 further may include a "catalog search" 336 grouping of metadata that allows searching based upon pricing, ratings/reviews, and versioning/updates. The catalog search metadata 336 may comprise metadata to allow users to search for applications based upon selected categories of metadata, including but not limited to whether or not an application is free, and/or whether an application has a certain rating level. Other items of metadata that may be contained within the catalog search metadata 336 include, but are not limited to, device type, operating system type, phone type, ISV (independent software vendor) identity, etc.

Various interdependencies exist between the categories of metadata shown in FIG. 3. These interdependencies may arise, for example from relationships between the data contained in each interdependent category. For example, the catalog search metadata 336 may be interdependent with the pricing metadata 322, subscription rate metadata 324, product family metadata 326, stock keeping unit metadata 328, application versioning and update-related metadata 330, and the application rating and reviews-related metadata 332. Likewise, the device-related metadata 314, market-related metadata 316, promotional metadata 318, and the mobile operator-related metadata 320 also may be interdependent upon one another, as well as with pricing metadata 322 and rate metadata 324. These groups of interdependencies are indicated by arrows in FIG. 3. These interdependencies may affect various processes, such as the intake and/or updating of metadata in each category. For example, changing one item of metadata in one class (e.g. application versioning and updates) may result in a change to other items of metadata in other classes (e.g. pricing, rates, application ratings and reviews). Therefore, an application/update intake process may take into account these interdependencies to ensure that all metadata affected by the intake of one type of metadata is updated correspondingly.

FIG. 4 shows a mapping of the logical architecture embodiment of FIG. 3 to various physical components of FIG. 1. First, FIG. 4 depicts mobile device 102 and computing device 128 in communication with networks 108, 109, 114 of FIG. 1. Next, mobile device server 116 of FIG. 1 is depicted as a plurality of website web servers 404 and catalog web services servers 406 connected to the networks 108, 109, 114 via suitable network devices, depicted schematically as a router 402. As shown in FIG. 4, the API layer 302 and the logic layer 304 of logical architecture 300 may be physically located on the website web servers 404 and the catalog web services servers 406. In this manner, search requests, application provision requests, and the like are received by appropriate APIs at the API layer 302.

Next, FIG. 4 shows database 118 in FIG. 1 as a plurality of database servers 408 (labeled "SQL Servers"). As shown in FIG. 4, the data layer 306 may be physically located on the database servers 408. The logical components of the data layer 306 may be embodied in various manners in the physical architecture shown in FIG. 4. For example, the data layer 306 may comprise an attributes component 410 that comprises various tables each having one or more attributes. In one embodiment, each table corresponds to a group of metadata, or a portion of a group of metadata, as described with reference to FIG. 3, and the attributes correspond to types of metadata within each group.

Further, the data layer 306 also may comprise a stored procedures component 412 that comprises one or more stored procedures 414 located on the database (depicted as an arbitrary number N of stored procedures). The stored procedures 414 contained within the stored procedures component 412 may have any suitable function or functions. For example, in some embodiments, specific APIs 416 in the API layer 302 may be mapped to specific stored procedures to perform specific filtering. As a more specific example, an API in the API layer may be configured to receive a search request that requests the return of a list of the 25 most popular applications for that device. The API receiving the request may forward the filtering information contained in the request (e.g. device type information, market identification information, and/or mobile operator identification information) to the stored procedure mapped to that API. Referring back to FIG. 3, the stored procedure then may perform the database search (e.g. using the catalog search metadata 336) as filtered by the filtering information in the request to obtain an initial search result set. Any relevant exclusions stored in exclusions-related metadata 334 also may be applied via one or more stored procedures to return an intermediate search result set. Finally, one or more business rules may be applied to produce a final search result set that is returned to the mobile device via the API layer.

Referring now to FIGS. 3 and 4, it will be understood that the various groups of metadata stored in the database servers 408 may be implemented in various different locations within the physical and logical architectures. Specific examples of the implementations of some of the groups of metadata in one embodiment are as follows. First, as mentioned above, the exclusions-related metadata 334 may be implemented, for example, as stored procedures stored on the database servers. This implementation of the exclusions metadata may be suitable, for example, where the exclusions are to be implemented as a thick layer between the data layer 306 and the logic layer 304, as the use of stored procedures to implement exclusions may increase the efficiency and speed at which the exclusions are applied.

Next, the device-related metadata may be implemented in the attributes component 410 of the data layer 306. Likewise, the market-related metadata may be implemented in each of the attributes component 410, the stored procedures component 412, and the business logic layer 310. As a more specific example of such an implementation, device-related information may be implemented at the attributes component 410 to facilitate searching for applications suitable for a specific operating system, and then at the stored procedures component 412 to exclude any versions of an operating system not compatible with the device that requested the search.

Next, the pricing metadata 322 and subscription rate metadata 324 may be implemented at each of the attributes component 410 and at the logic layer 306. For example, pricing metadata may be implemented at the attributes component 410 for searching for applications, and at the business console 312 and/or business logic layer 310 for completing payment transactions for an application selected by a user for purchase, for arranging a search result set to achieve a selected mixture of free and paid applications, etc.

Likewise, the promotion-related metadata 318 may be implemented at the attributes component 410 (e.g. to assist in searching for applications), at the stored procedures component 412 (e.g. for specific promotion-related searches implemented in a stored procedure), and in the logic layer 304 (e.g. for use by the business console 312 to complete purchasing transactions). Continuing, the application versioning and update-related metadata 330, the application ratings and reviews-related metadata 332, and the catalog search metadata 336 also may be implemented at each of the attributes component 410, the stored procedures component 412, and the logic layer 304 in a similar manner. Additionally, the mobile operator-related metadata 320 may be implemented in attributes (e.g. to facilitate searching for applications) and in stored procedures (e.g. to exclude applications based upon this metadata). It will be understood that the specific implementations of metadata usage described herein is presented for the purpose of example, and is not intended to be limiting in any manner.

Figure 5B:
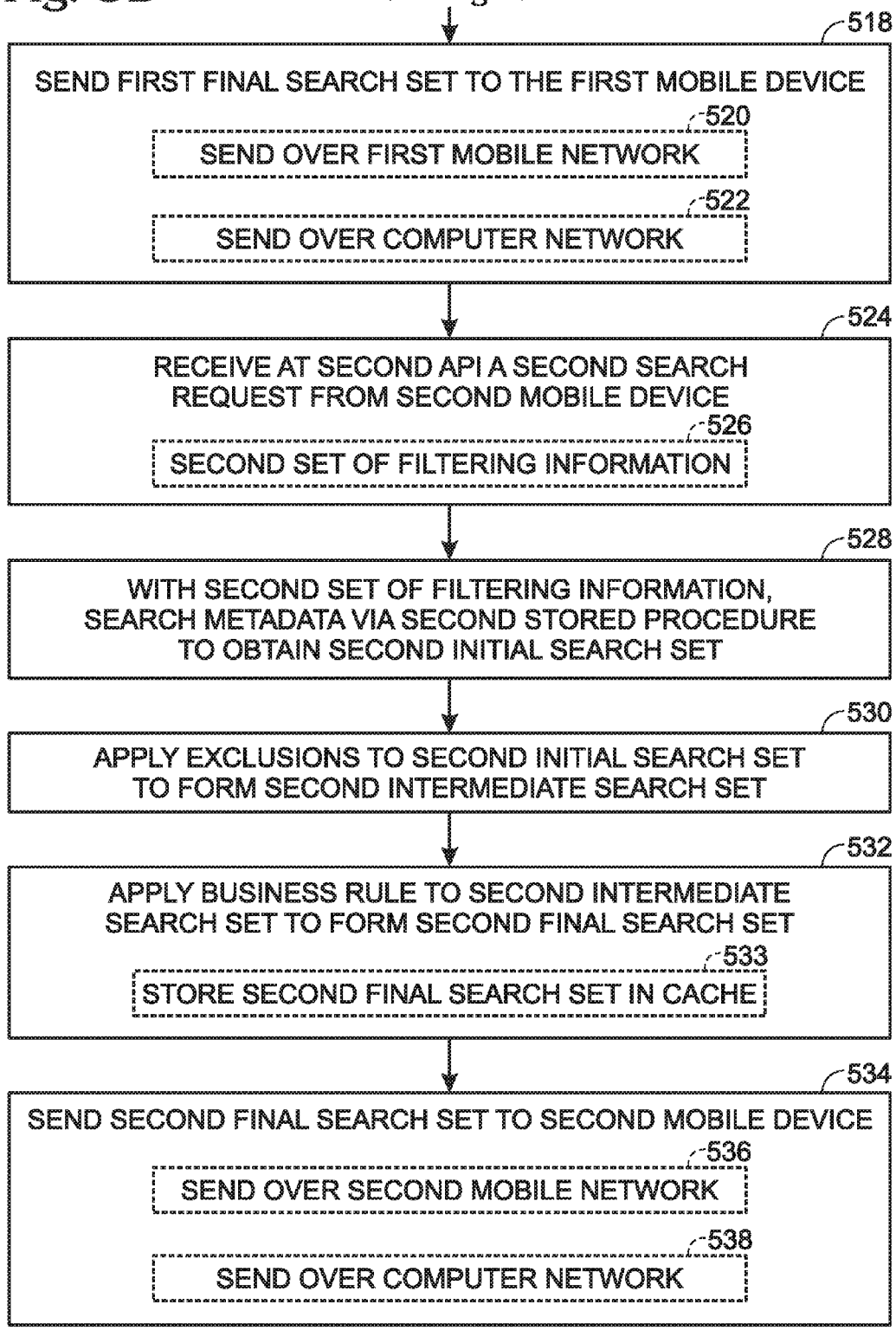

FIGS. 5A-5B show an embodiment of a method of providing a list of compatible applications to mobile devices that illustrates some of features described above. Method 500 first comprises, at 502, receiving at a first API a first search request from a first mobile device. The first request may be received via any suitable network or combination of networks, including but not limited to a computer network such as the Internet, as well as via a mobile device network that interfaces with a computer network.

The first request may include various items of filtering information to facilitate a search for applications configured for use with the requesting mobile device. For example, the filtering information 504 may comprise market identification information 506 (e.g. code country, language, currency, etc.), device type information 508 (e.g. code operating system, operating system version, etc.), and/or mobile operator identification information 510. The filtering information also may include specific user-directed filters 511 to apply. Examples include, but are not limited to, filters to return a list of most popular applications, a list of newest applications, a list of most popular free applications, a list of most popular paid applications, a list of applications for a specific device (e.g. a specified portable media player), a list of editorially selected "hot" applications, a list of categories of applications, etc. In some embodiments, these various specific filters may map to specific APIs configured to handle each of these user-directed filters.

Continuing, method 500 next comprises, at 512, searching the metadata in the data layer via a stored procedure mapped to the first API to obtain a first initial search result set. The term "initial search result set" is used herein to apply to a database search result set that has not yet had exclusions applied. Continuing with method 500, exclusions are applied at 514 to the first initial search result set to form a first intermediate search result set. The term "intermediate search result set" is used herein to describe a database search result set that to which exclusions have been applied, but no business rules have yet been applied at the logic layer. Method 500 next includes, at 516, applying any relevant business rules to the first intermediate search result set to form a first final search result set. The final search result set may be cached at 517, thereby federating the search results for access in subsequent searches sent by other requesting devices of the first device type.

The first final search result set is then returned to the first API, and is sent to the first mobile device at 518. Where the first search request originated from a client on the first mobile device, the first final search result set may be sent to the first mobile device via a first mobile network, as indicated at 520. Likewise, where the first search request originated from a computing device, for example, a desktop client or a web-based client running on a browser on the computing device, the first final search result set may be sent to the computing device via a computer network, as shown at 522.

It will be understood that the first final search result set may include any suitable information to present to a user of the mobile device. For example, the first final search result set may include title information, artwork, descriptions, and/or ratings and/or reviews of each application found in the search. Along with the presentation of this information, a mechanism also may be provided to download the application. It will be understood that these examples of metadata that may be included in the first final search result set are presented for the purpose of example, and are not intended to be limiting in any manner.

Method 500 next comprises, at 524, receiving at a second API a second search request from a second mobile device, wherein the second search request contains a second set of filtering information 526. This filtering information then may be used to search the metadata contained within the data layer 306 via a second stored procedure mapped to the second API to obtain a second initial search result set, as indicated at 528. The second set of filtering information comprises any suitable filtering information that allows the identification of a set of applications configured to be run on the second mobile device. It will be understood that the second mobile device may be a different device type than the first mobile device (e.g. different operating system, different operating system version, etc.). Therefore, the use of the second set of filtering information to search for applications may result in the return of a different set of search results configured for use with a different type of mobile device than the use of the first set of filtering information.

Next, method 500 comprises, at 530, applying any relevant exclusions to the second initial search result set to form a second intermediate search result set, and then, at 532, applying any relevant business rules to the second intermediate search set to form a second final search set, which may be cached, as indicated at 533, for access by other devices of the second type that request subsequent searches. The second final search set is then sent to the second mobile device at 534. Where the second search request originated from a client on the second mobile device, the second final search result set may be sent to the second mobile device via a second mobile network, as indicated at 536 (or over the first mobile network, if the first and second mobile devices run on the same mobile network). Likewise, where the second search request originated from a computing device, for example, a desktop client or a web-based client running on a browser on the computing device, the second final search result set may be returned to the second API, and then sent to the computing device via a computer network, as shown at 522. It will be understood that the application server, after sending the first final search result set to the first mobile device and the second final search result set to the second mobile device, may receive requests for applications from each mobile device, and then provide the requested applications to the mobile devices, as described above with reference to FIG. 2.

It will be appreciated that the embodiments described above are extremely flexible and extensible to new device types and/or metadata groups. For example, new types of devices may be added to the architectures/methods described above simply by assigning the new device types a device code that may be supplied as filtering information in an application search request. This device code may then be used as a filter in a database search to ensure that applications intended for the new device type are returned as search results.

Figure 6:
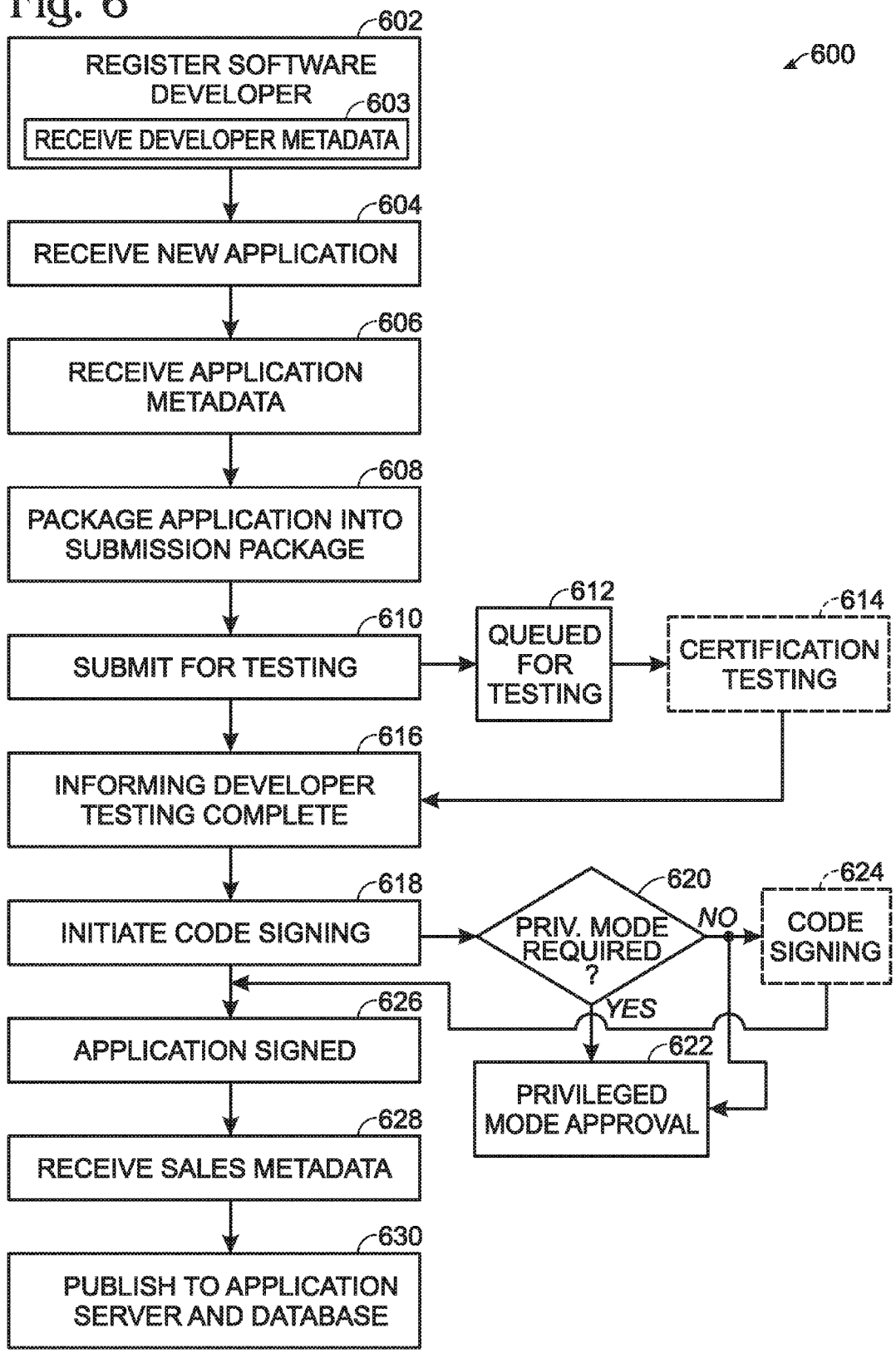
FIG. 6 shows an embodiment of a method of receiving mobile device applications from third-party developers for provision to mobile devices.

An application intake process may be provided to facilitate the addition of new applications to the application server 116 (whether for known device types or new device types) to further enhance the flexibility of the systems and methods. FIG. 6 shows an embodiment of a method 600 for the addition of a new application to database 118 that illustrates various stages in the application intake process in which metadata may be submitted. First, prior to submitting a new application, method 600 comprises, at 602, registering a software developer (or vendor, etc.) to have its applications distributed by the mobile device application server 116. In this registration process, various items of developer-related metadata (or vendor-related metadata, etc.) may be submitted. These items of metadata may then be automatically associated with any applications submitted by the developer or vendor. Examples of metadata submitted at the registration stage include, but are not limited to, developer name, partner identification number (for recognized partners of the administrator of the mobile device application server 116), address information, email and website contact information, company logo, tax identification bank routing/account information, publisher identification information (e.g. an identification provided by an approved certificate authority), certificate authority information (e.g. identification of the certificate authority that holds the publisher identification information), and payment information (e.g. information regarding how payment for an application purchase is to be made. It will be understood that these examples of metadata submitted in the developer/vendor registration process are presented for the purpose of example, and are not intended to be limiting in any manner.

Next, method 600 comprises, at 604, publishing a new application by submitting the new application to the mobile device server administrator (e.g. via developer console 138), and, at 606, entering a first set of metadata associated with the application. The first set of metadata may comprise any suitable metadata. Examples include, but are not limited to, content type (e.g. stand-alone application or widget application), product name, product version, platform/operating system, supported devices (e.g. by manufacturer/model) desired market as defined by language, country, and/or currency (e.g. English/U.S.A./$USD), as well as functional information, key descriptors, screen shots, image assets, and signing information. Furthermore, metadata related to capabilities of mobile devices utilized by the application also may be entered as device-related metadata. Examples of such metadata include, but are not limited to, metadata related to audio, keyboard, directional pad, memory expansion, Bluetooth, universal serial bus (USB), WiFi, infrared communications, still/video camera capabilities, accelerometer or other motion sensor, touch-sensitive input, fingerprint scanner, barcode scanner, FM radio, TV out, and other such capabilities of a mobile device. It will be understood that these items of metadata submitted with an initial application submission are presented for the purpose of example, and are not intended to be limiting in any manner.

Next, the application is packaged at 608 with additional data for use by a testing entity, submitted for testing at 610, queued for testing at 612, and then undergoes testing at 614. Such testing may be performed by the mobile device server administrator or a third-party certification authority to ensure that the application meets any applicable standards and that the application functions properly. Upon the completion of testing, the developer is notified at 616 that testing is complete (e.g. via email or other suitable communications channel), and code signing is completed at 618, 620, 622, 624 and 626 to encrypt the application code. This may help to avoid "man in the middle" security attacks during transmission of the application code to a requesting device. The code signing process may or may not include a privileged mode approval, as indicated at 620 and 622.

Continuing with FIG. 6, after the application is signed, metadata in the form of sales metadata may be received at 628. Such metadata may include, but is not limited to, pricing by market, keywords, categorization, promotion and discount-related metadata, and the like. Further, any other suitable metadata may be submitted at this time. Upon receiving this metadata, the application and all metadata may be published to the mobile device application server for download by customers.

Figure 7:
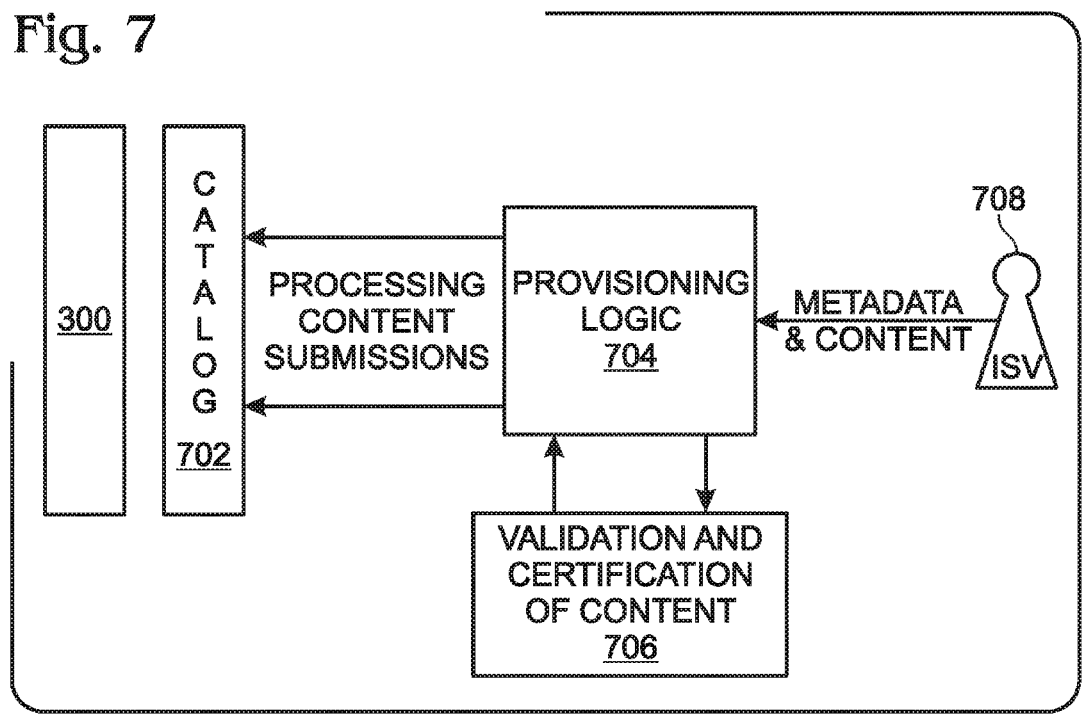
FIG. 7 shows an embodiment of a logical architecture of a system for provisioning applications to a mobile device application server.

FIG. 7 shows an embodiment of a logical architecture for a system for provisioning applications that can then be searched via the logic shown in FIG. 3. The logical architecture of FIG. 3 is shown generally at 300 in FIG. 7. FIG. 7 also shows a catalog 702 comprising a plurality of applications, provisioning logic 704, and validation and certification logic 706. As described above in the context of FIG. 6, metadata and application content is first submitted by an independent software vendor 708 or other entity. The application content is then tested, either by the entity that administrates the application server or by another entity, via validation and certification logic 706. Likewise, if an application is validated, the application also may be signed via validation and certification logic 706. After signing, the application is returned to the provisioning logic 704, which then processes the submission of content into catalog 702. This submission process may comprise entering the metadata into the various categories/tables of metadata described above, and also may comprise setting a flag or other indicator alerting devices that a state change has occurred on the application server.

It will be understood that the configurations and/or approaches described herein for providing applications to mobile devices are presented for the purpose of example and not intended to be limiting, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A mobile device application server, comprising:
    a processor; and
    memory comprising instructions stored thereon that are executable to provide applications to mobile devices by:
        receiving a first application configured to be run on a first mobile device type;
        storing the first application;
        receiving a second application configured to be run on a second mobile device type;
        storing the second application;

receiving from a first mobile device of the first mobile device type a request for a list of applications that are compatible with the first mobile device type, the request including device type information for the first mobile device;

utilizing the device type information for the first mobile device to determine applications that are compatible with the first mobile device, and applying one or more of an exclusion and a business rule to the applications that are compatible with the first mobile device to obtain a list of applications that comprises the first application;

sending to the first mobile device the list of applications that comprises the first application;

receiving from a second mobile device of the second mobile device type a request for a list of applications that are compatible with the second mobile device type, the request including device type information for the second mobile device;

determining a list of applications that comprises the second application via application of the device type information for the second mobile device; and sending to the second mobile device the list of applications that comprises the second application.

2. The mobile device application server of claim 1, wherein the instructions are further executable to determine the list of applications that comprises the first application by:

applying one or more of market information and mobile operator information for the first mobile device to query a database to obtain a first initial search result set of applications configured to run on the first mobile device type;

applying the exclusion to the initial search result set to form a first intermediate search result set;

applying the business rule to the first intermediate search result set to form a first final search result set; and sending the first final search result set to the first mobile device as the list of applications that comprises the first application.

3. The mobile device application server of claim 1, wherein the request for a list of applications that are compatible with the first mobile device type further comprises one or more of market information and mobile operator information for the first mobile device.

4. The mobile device application server of claim 2, wherein the instructions are further executable to apply the exclusion as a thick layer via one or more stored procedures after forming the first initial search result set.

5. The mobile device application server of claim 1, wherein the instructions are further executable to apply the exclusion as a thin layer while searching each metadata group of a plurality of metadata groups.

6. The mobile device application server of claim 1, wherein the device of the first type and the device of the second type differ in one or more of a manufacturer, operating system, and mobile network.

7. In a mobile device application server system comprising memory and one or more logic components, a method of providing a list of applications to a mobile device, the method comprising:

receiving a first application configured to be run on a first mobile device type;

storing the first application;

receiving a second application configured to be run on a second mobile device type;

storing the second application;

receiving from a first mobile device of the first mobile device type a request for a list of applications that are compatible with the first mobile device type, the request including device type information for the first mobile device;

utilizing the device type information for the first mobile device to determine applications that are compatible with the first mobile device, and applying one or more of an exclusion and a business rule to the applications that are compatible with the first mobile device to obtain a list of applications that comprises the first application;

sending to the first mobile device the list of applications that comprises the first application;

receiving from a second mobile device of the second mobile device type a request for a list of applications that are compatible with the second mobile device type, the request including device type information for the second mobile device;

determining a list of applications that comprises the second application via application of the device type information for the second mobile device; and sending to the second mobile device the list of applications that comprises the second application.

8. The method of claim 7, further comprising:

applying one or more of market information and mobile operator information for the first mobile device to query a database to obtain a first initial search result set of applications configured to run on the first mobile device type;

applying the exclusion to the initial search result set to form a first intermediate search result set;

applying the business rule to the first intermediate search result set to form a first final search result set; and sending the first final search result set to the first mobile device as the list of applications that comprises the first application.

9. The method of claim 8, wherein the request for a list of applications that are compatible with the first mobile device type further comprises one or more of market information and mobile operator information for the first mobile device.

10. The method of claim 8, further comprising applying the exclusion as a thick layer via one or more stored procedures after forming the first initial search result set.

11. The method of claim 7, further comprising applying the exclusion as a thin layer while searching each metadata group of a plurality of metadata groups.

12. The method of claim 7, wherein the device of the first type and the device of the second type differ in one or more of a manufacturer, operating system, and mobile network.

13. A mobile device application server, comprising:

a processor; and memory comprising instructions stored thereon that are executable to provide applications to mobile devices by:

receiving a first application configured to be run on a first mobile device type;

storing the first application;

receiving a second application configured to be run on a second mobile device type;

storing the second application;

receiving from a first mobile device of the first mobile device type a request for a list of applications that are compatible with the first mobile device type, the request including one or more of mobile operator information and market information for the first mobile device;

utilizing the one or more of mobile operator information and market information for the first mobile device to determine applications that are compatible with the first mobile device, and applying one or more of an exclusion and a business rule to the applications that are compatible with the first mobile device to obtain a list of applications that comprises the first application;

sending to the first mobile device the list of applications that comprises the first application;

receiving from a second mobile device of the second mobile device type a request for a list of applications that are compatible with the second mobile device type, the request including one or more of mobile operator information and market information for the second mobile device;

determining a list of applications that comprises the second application via application of the one or more of mobile operator information and market information for the second mobile device; and sending to the second mobile device the list of applications that comprises the second application.

14. The mobile device application server of claim 13, wherein the request for a list of applications that are compatible with the first mobile device type further comprises device type information for the first mobile device.

15. The mobile device application server of claim 13, wherein the instructions are further executable to determine the list of applications that comprises the first application by:

applying one or more of market information and mobile operator information for the first mobile device to query a database to obtain a first initial search result set of applications configured to run on the first mobile device type;

applying the exclusion to the initial search result set to form a first intermediate search result set;

applying the business rule to the first intermediate search result set to form a first final search result set; and sending the first final search result set to the first mobile device as the list of applications that comprises the first application.

16. The mobile device application server of claim 13, wherein the instructions are further executable to apply the exclusion as a thick layer via one or more stored procedures after forming the first initial search result set.

17. The mobile device application server of claim 13, wherein the instructions are further executable to apply the exclusion as a thin layer while searching each metadata group of a plurality of metadata groups.

18. The mobile device application server of claim 17, wherein the metadata groups comprise device-related metadata, market-related metadata, promotion-related metadata, mobile operator policy-related metadata, pricing metadata, subscription rate metadata, product family metadata, stock keeping unit-related metadata, application versioning and update-related metadata, and application rating and review-related metadata.

19. The mobile device application server of claim 13, wherein the device of the first type and the device of the second type differ in one or more of a manufacturer, operating system, and mobile network.

20. The mobile device application server of claim 13, wherein the market information comprises one or more of country information, language information, and currency information.

\* \* \* \* \*